United States Patent [19]
Dorsey

[11] 3,921,055
[45] Nov. 18, 1975

[54] WELDING POWER SUPPLY HAVING DUAL OUTPUT TRANSFORMER

[75] Inventor: William Franklin Dorsey, Florence, S.C.

[73] Assignee: Union Carbide Corporation, New York, N.Y.

[22] Filed: Dec. 20, 1973

[21] Appl. No.: 426,560

Related U.S. Application Data

[63] Continuation of Ser. No. 299,098, Oct. 19, 1972, abandoned.

[52] U.S. Cl............... 321/24; 219/135; 323/43.5 R; 323/48; 336/150; 336/178; 336/184
[51] Int. Cl.².................. B23K 9/08; H01F 29/02
[58] Field of Search............... 219/116, 131 R, 135; 321/24; 323/6, 43.5 R, 44 R, 48, 60; 336/150, 160, 170, 178, 184

[56] References Cited
UNITED STATES PATENTS

| | | | |
|---|---|---|---|
| 400,515 | 4/1889 | Thomson | 323/6 |
| 1,480,857 | 1/1924 | Flood et al. | 323/60 UX |
| 2,086,316 | 7/1937 | Holslag | 219/131 R |
| 3,059,170 | 10/1962 | Jetter | 336/184 X |
| 3,188,552 | 6/1965 | Owen | 323/48 |
| 3,260,975 | 7/1966 | Howard | 336/184 X |
| 3,316,481 | 4/1967 | Owen | 323/6 |
| 3,522,411 | 8/1970 | Rienks | 219/131 R |
| 3,535,617 | 10/1970 | Landis | 323/43.5 R |
| 3,584,290 | 6/1971 | Spreadbury | 323/6 |
| 3,686,561 | 8/1972 | Spreadbury | 323/6 |

FOREIGN PATENTS OR APPLICATIONS

| | | | |
|---|---|---|---|
| 423,300 | 7/1947 | Italy | 323/44 R |

*Primary Examiner*—A. D. Pellinen
*Attorney, Agent, or Firm*—Eugene Lieberstein

[57] ABSTRACT

A welding power supply incorporating a transforming device comprising a three legged ferromagnetic core structure wherein the third leg of the structure is separated from the other legs by at least one nonmagnetic gap and wherein the primary winding is wound about the first leg and the secondary winding wound partially about the first leg and partially about the third leg.

4 Claims, 4 Drawing Figures

WELDING POWER SUPPLY HAVING DUAL OUTPUT TRANSFORMER

This is a continuation of application Ser. No. 299,098 filed Oct. 19, 1972 and now abandoned.

The present invention relates to welding power supplies and more particularly to a welding power supply incorporating an improved alternating current welding transformer design.

BACKGROUND OF INVENTION

Welding power supplies are designed to provide either a constant potential volt-ampere characteristic or an essentially constant current volt-ampere characteristic. Prior attempts to fabricate a power supply of the electromagnetic type using only one welding transformer for producing either type output characteristic has not been successful for one or more of the following reasons: 1— limited range of welding current; 2— insufficient short circuit current for start-up purposes in the constant current operating mode; 3— variations in open circuit voltage at different current settings in the constant current mode; and 4— too large a slope to satisfy constant voltage requirements.

It is consequently among the objects of the present invention to provide a power supply of the electromagnetic type using a single transforming device which is capable of providing either of the desired output welding volt-ampere characteristics without any of the above mentioned disadvantages.

SUMMARY OF THE INVENTION

The foregoing objectives are obtained by incorporating in the power supply of the present invention a transforming device comprising a three legged ferromagnetic core structure wherein the third leg of the structure is separated from the other legs by at least one non-magnetic gap of predetermined dimension. Upon the first leg is wound the primary winding and a first section of the secondary winding with such first wound section closely coupled to the primary. A second section of the secondary, connected in series with the first section, is wound about the third leg of the magnetic core. A plurality of taps are brought out from the first section of the secondary winding to provide the constant voltage characteristics and a plurality of taps brought out from the second section of the secondary winding to provide the constant current characteristics.

BRIEF DESCRIPTION OF THE DRAWINGS

Advantages and other objects of the present invention will be apparent from the following detailed description with reference to the accompanying drawings in which.

DESCRIPTION OF THE INVENTION

Figure 1:
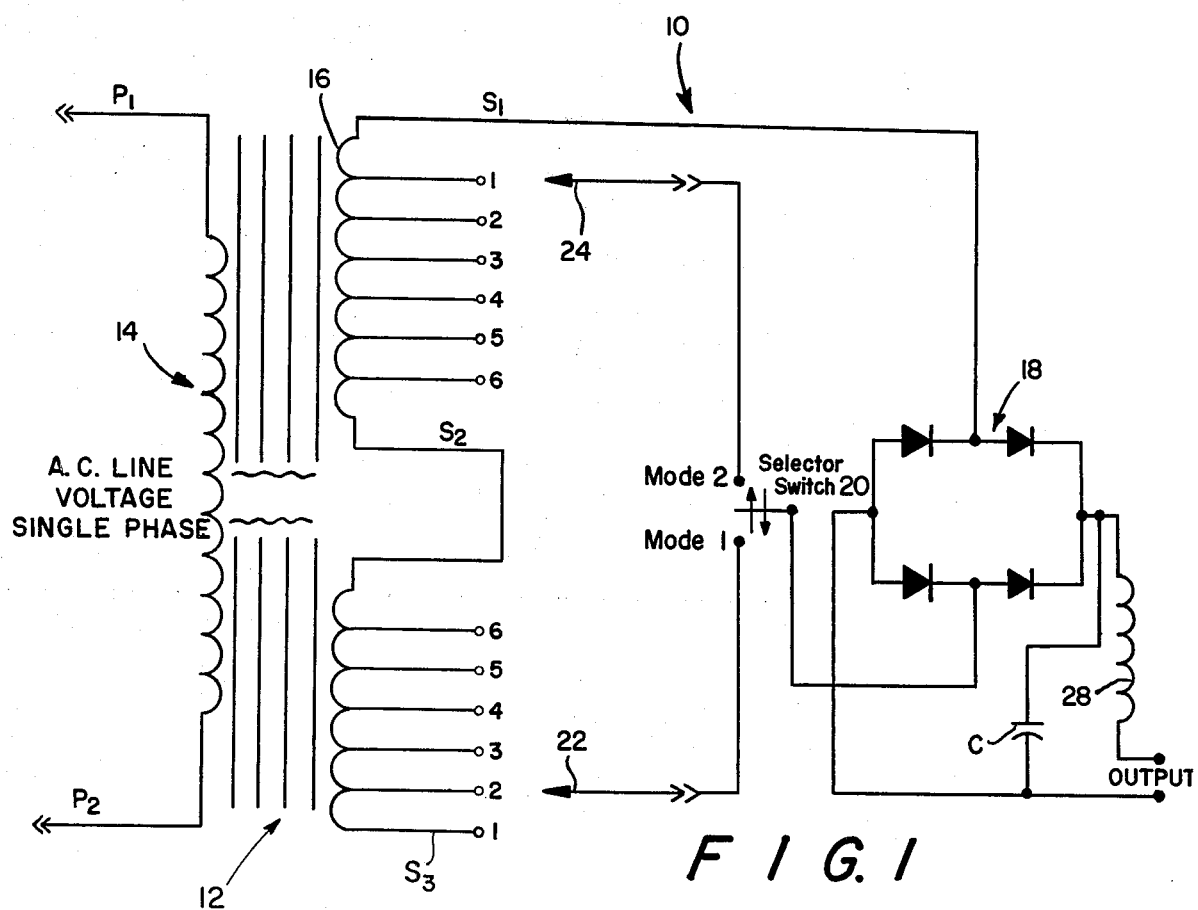
FIG. 1 is an electrical schematic diagram of the power supply of the present invention.

The power supply 10 of the present invention is shown schematically in FIG. 1 and comprises a transforming device 12 including a primary winding 14 and a secondary winding 16. A full wave bridge rectifier 18 is coupled to the secondary 16 through a manual selector switch 20 which permits the selection of one of two operating mode positions each providing a different type volt-ampere characteristic. In mode 1 the power supply 10 will function as a constant current source with plug 22 providing a manual selection of different operating currents corresponding to tap positions 1 to 6 between leads S2 and S3 of secondary winding 16. In mode 2 the power supply 10 will function as a source of constant potential with plug 24 providing a manual selection of different operating voltages corresponding to tap positions 1 to 6 between leads S1 and S2 of secondary winding 16. An inductor 28 may, if desired, be connected in series with the output of power supply 10 by means of a relay switch or the like (not shown) during constant current operation i.e. with the selector switch 20 in mode 1. A filter capacitor C may likewise be connected in parallel with the output.

Figure 2:
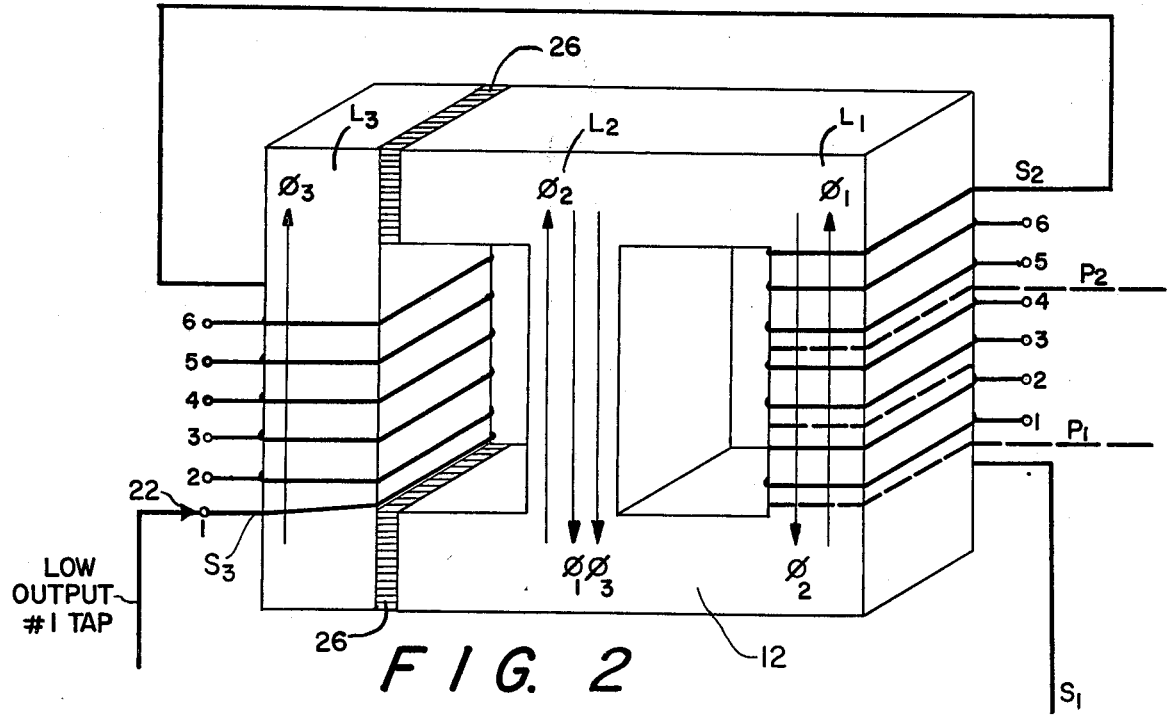
FIG. 2 is a prespective showing of the basic three legged ferromagnetic core structure with the primary and secondary wound in accordance with the present invention.

Referring now to FIG. 2 in which the transforming device 12 of FIG. 1 is shown in perspective with the primary and secondary wound in accordance with the teachings of the present invention. Transforming device 12 is a three legged ferromagnetic core with two non-conducting mediums 26 separating the third leg L3 at each end thereof from the second and first legs L2 and L1 respectively. Any insulating material may be used for each non-conducting medium 26 although a fiber glass reinforced plastic structural insulating material is preferred. The non-conducting mediums 26 form two non-magnetic gaps, preferably of equal spacing, for limiting the flux $\phi 3$ in leg L3 to a low value when the secondary winding output is unloaded i.e., open circuited, as will be further elaborated on hereafter. The gap provided by each non-conducting medium 26 should represent a space of between ⅛ to 5/16 inches respectively. Although two gaps are shown only one is essential to practice the invention. In such instance the gap should be at least ¼ inch.

The primary winding 14 is wound about leg L1 and is connected to an AC source of supply through input leads P1 and P2. The secondary winding 16 is shown partially wound on leg 1, which portion will hereinafter be referred to as the first section of the secondary winding, and partially wound on leg L3 which portion will hereinafter be referred to as the second section of the secondary winding 14. The first section, from lead S1 to lead S2, is wound closely coupled to the primary winding 14. The second section is connected from lead S2 to lead S3 and is electrically connected in series with the first section of secondary winding 16.

Figure 3:
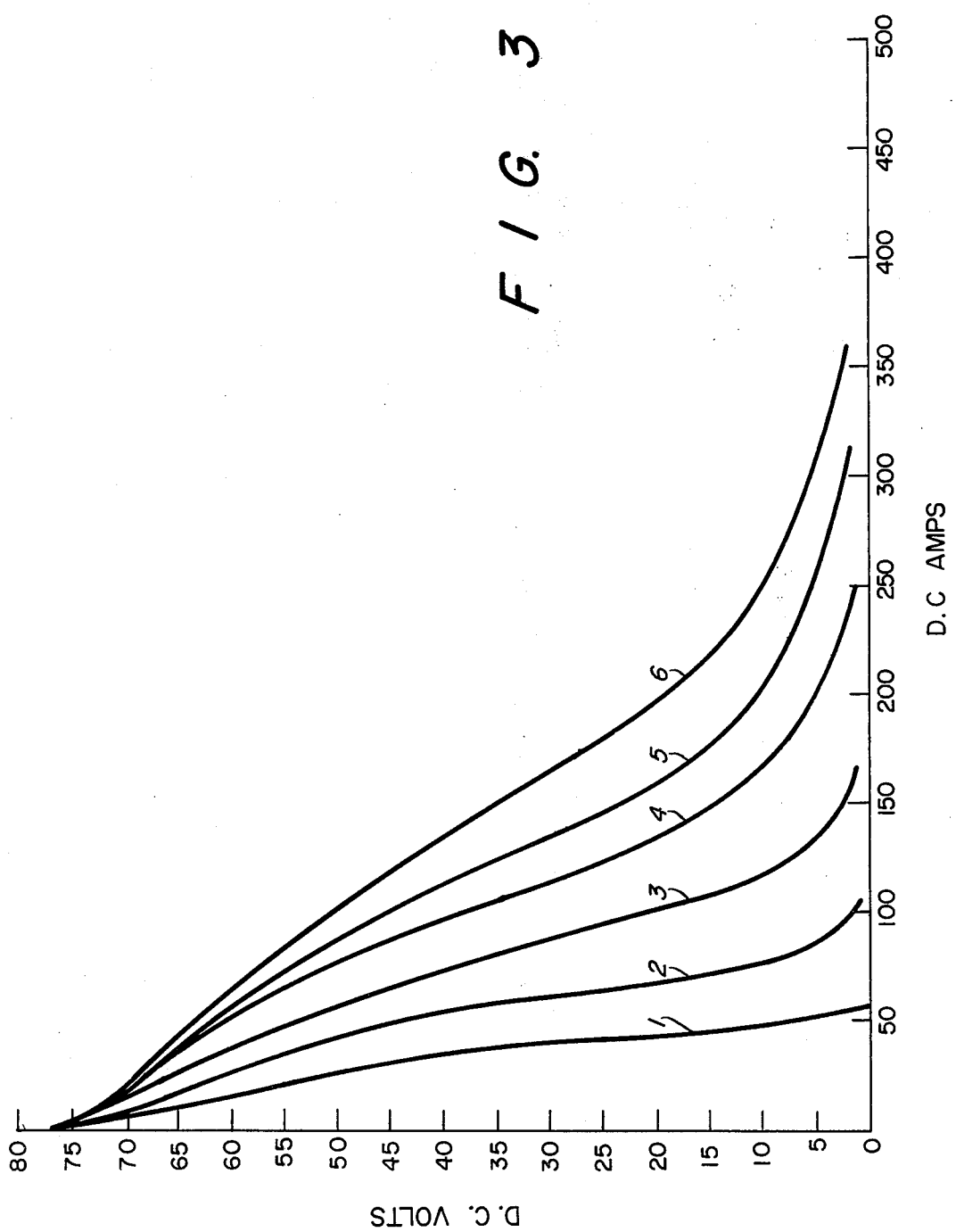
FIG. 3 shows a set of output volt-ampere characteristic curves for the power supply of FIG. 1 in the constant current mode of operation.

FIG. 3 shows a set of volt-ampere characteristic curves for the power supply of FIG. 1 with the selector switch 20 placed in mode position 1. The curves are numbered from 1 to 6 and correspond to tap positions 1 to 6 on the second section of secondary winding 16. As is apparent from FIG. 3, the output from any one of the six tap positions is essentially one of constant current for the normal operating arc voltage region whereas at low voltages each curve extends outwardly on the abscissa providing at short circuit a substantially larger current than the normal working current. This latter characteristic is essential to arc processes such as TIG and covered electrode welding where high starting currents are needed to initiate the arc. Otherwise auxiliary means would have to be used to provide the required starting currents. It is equally improtant to note that the open circuit voltage for each curve is substantially the same with a measured maximum variation from the lowest output current tap to that of the highest of only 2 volts.

The latter two features namely the substantially fixed open circuit voltage, with a relatively steep voltampere curve at appropriate operating arc voltages, and the flattenting out of the slope to obtain high starting currents give the power supply 10 of the present invention the advantages most lacking in prior art electromagnetic power supplies of the dual output characteristic type. The non-magnetic gaps 26 are considered to be primarily responsible for achieving the volt-ampere output characteristic of FIG. 3. By separating the third leg L3 of transforming device 10 from legs L2 and L1 respectively, using the non-magnetic gaps 26, core saturation of the center leg L2 is prevented when leg L3 goes into deep saturation at short circuit. The non-magnetic gaps 26 must however be properly dimensioned i.e. provide sufficient spacing to absorb the mmf so that the flux $\phi 3$ is prevented from causing such saturation in the center leg L2. Hence, as mentioned earlier, a minimum gap length of ⅛ inch is required to keep fringing effects minimized with the maximum permissable gap length being about 5/16 inch before affecting the steepness of the volt-ampere characteristic curves required for normal operation. Moreover, when the second section of the secondary winding 16 is unloaded i.e. open circuited, the non-magnetic gaps 26 limit the flux $\phi 3$ in leg L3 to a low value thereby providing an essentially fixed open circuit voltage regardless of tap position.

Figure 4:
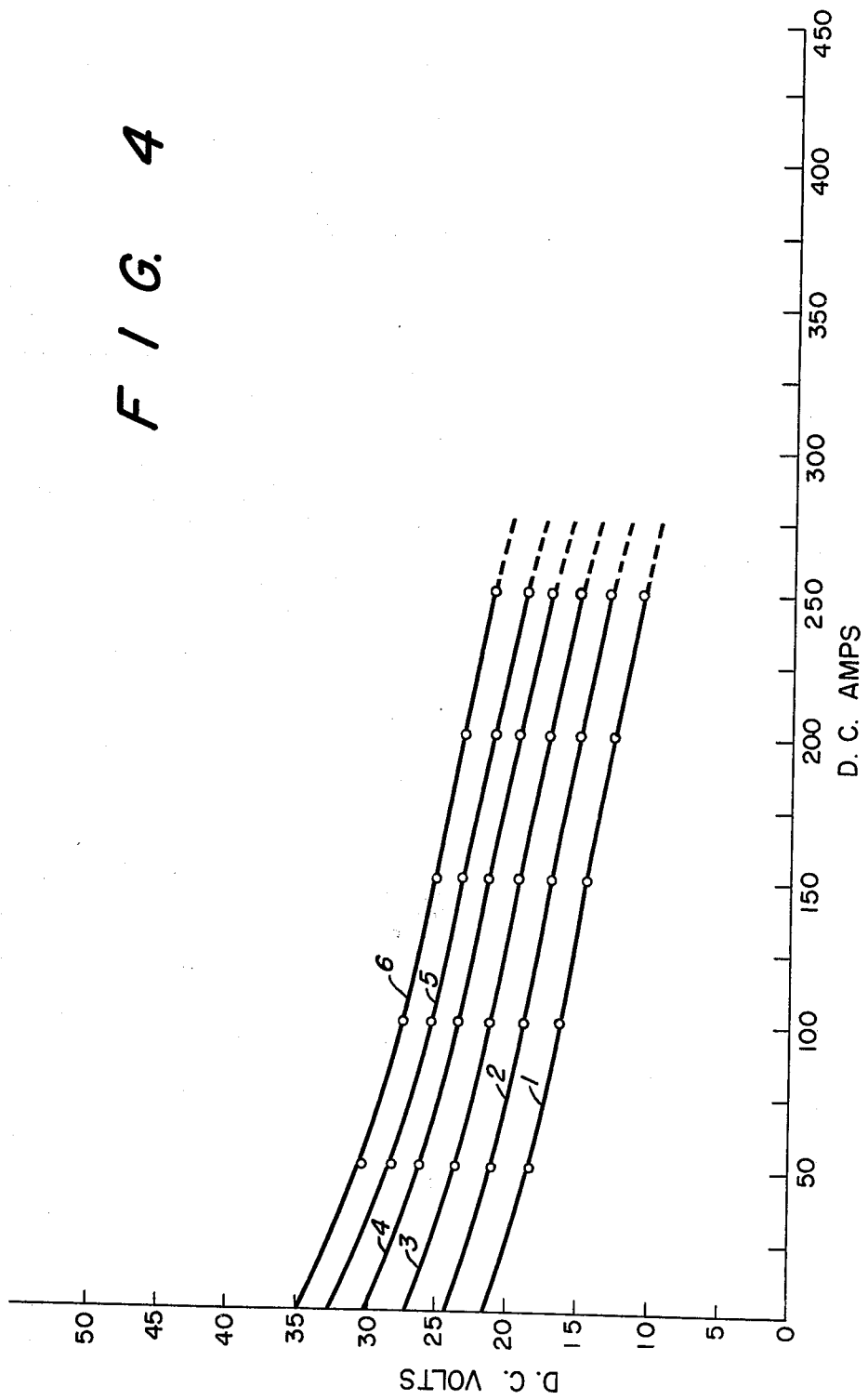
FIG. 4 shows a set of output volt-ampere characteristic curves for the power supply of FIG. 1 in the constant potential mode of operation.

With the selector switch 20 in the mode 2 position a power supply output of constant potential is obtained as indicated in FIG. 4 for each one of the tap positions on the first section of the secondary winding 26. By closely coupling the first section to the primary winding 14 the slope of each curve is held to below about 4.5 volts per 100 amperes D.C. This is a desired slope for the conventional MIG inert gas welding process.

What is claimed is:

1. An electric welding power supply comprising:
   a three legged ferromagnetic structure having a fixed core with each leg being substantially equal in cross-sectional area and length and with the second one of the legs located intermediate the first and third of said three legs respectively;
   at least one means of insulating material located between said second and third leg for limiting the passage of flux through said third leg;
   a primary winding wound on said first leg and adapted to be connected to a source of alternating current;
   a secondary winding having two series connected sections, the first of said sections being wound on said first leg in close coupling to said primary winding and the second of said sections being wound on the third leg of said structure;
   a first plurality of output taps located on said first section of said secondary winding for providing a plurality of constant potential outputs;
   a second plurality of output taps located on said second section of said secondary winding for providing a plurality of constant current outputs;
   a full wave bridge rectifier; and
   means for coupling said full wave bridge rectifier to any one of said plurality of output taps on said first and second sections respectively.

2. An electric welding power supply as defined in claim 1 wherein said insulating means is a plastic having a width between ⅛ – 5/16 inches.

3. An electric welding power supply as defined in claim 2 further comprising switch means having a first and a second position wherein when said switch means is in said first position said full wave bridge circuit is coupled to the secondary winding only through the output taps of said first section thereof and wherein when said switch means is in said second position said full wave bridge circuit is coupled to the secondary winding only through the output taps of said second section thereof.

4. A single phase dual output welding transformer structure comprising:
   a fixed ferromagnetic core structure having a first and second outer leg and a third leg located substantially intermediate said first and second legs, each leg being substantially equal in cross-sectional area and length;
   a primary winding wound on said first leg and adapted to be connected to a source of alternating current;
   a secondary winding have a first and second section connected in series to one another with said first section being wound on said first leg in close coupling to said primary winding and with said second section being wound on said second leg;
   at least one means of insulting material located between the second and third leg of said structure for limiting the passage of flux through said second leg;
   a first plurality of output taps located on said first section of said secondary winding for providing a plurality of constant potential outputs; and a second plurality of output taps located on said second section of said secondary winding for providing a plurality of constant current outputs.

* * * * *